(12) United States Patent
Armenio et al.

(10) Patent No.: US 12,122,605 B2
(45) Date of Patent: Oct. 22, 2024

(54) VIBRATORY FEEDING DEVICE FOR COMPACT DEDUSTING APPARATUS

(71) Applicant: Pelletron Corporation, Lancaster, PA (US)

(72) Inventors: Anthony Armenio, Lancaster, PA (US); Kyle Jacob Wilbert, Lancaster, PA (US); Peter David Birk, Lancaster, PA (US)

( * ) Notice: Subject to any disclaimer, the term of this patent is extended or adjusted under 35 U.S.C. 154(b) by 398 days.

(21) Appl. No.: 17/547,606

(22) Filed: Dec. 10, 2021

(65) Prior Publication Data

US 2023/0183010 A1    Jun. 15, 2023

(51) Int. Cl.
*B65G 11/20* (2006.01)
*B07B 4/02* (2006.01)

(52) U.S. Cl.
CPC .............. *B65G 11/206* (2013.01); *B07B 4/02* (2013.01); *B65G 2201/042* (2013.01)

(58) Field of Classification Search
CPC ............ B65G 11/206; B65G 2201/042; B65G 27/22; B65G 69/186; B07B 4/02; B07B 4/00; B07B 4/04; B07B 7/01; B07B 7/02; B07B 7/04; B07B 11/04; B07B 11/06; B07B 11/02; B29B 9/16
USPC ..................................................... 209/3, 133
See application file for complete search history.

(56) References Cited

U.S. PATENT DOCUMENTS 5,035,331 A * 7/1991 Paulson ..................... B07B 4/08
                                                    209/133
6,595,369 B2 * 7/2003 Paulson .................. B29C 45/18
                                                    209/137
7,380,670 B2    6/2008 Paulson et al.
9,962,741 B2    5/2018 Schneider et al.
2018/0093302 A1 * 4/2018 Schneider ................ B07B 4/02

(Continued)

FOREIGN PATENT DOCUMENTS

CN      212284874 U  *  1/2021
CN      112845079 A  *  5/2021
EP        3542913 A1 *  9/2019 ............. B07B 11/06

(Continued)

*Primary Examiner* — James R Bidwell
*Assistant Examiner* — Muhammad Awais
(74) *Attorney, Agent, or Firm* — Miller Law Group, PLLC (57) ABSTRACT

A compact dedusting apparatus for cleaning particulate materials of contaminates and has a housing defining a cleaning area in which the contaminants are removed to create cleaned particulate material with a product discharge opening through which cleaned particulate material can be discharged. The dedusting apparatus includes an infeed apparatus having a vibratory feed pan powered by a vibration generator to induce vibrations therein. The dedusting apparatus also includes a Venturi chamber to remove contaminants from the particulate material by a flow of air passing upwardly through the product discharge opening. The dedusting apparatus further includes an interchangeable carryover deflector having a chamber extension member that aligns with internal structure to control the flow of particulate material into said Venturi chamber and deflects particulate material entrained in the air flow through the Venturi chamber toward the product discharge opening. The carryover deflector incorporates an observation window to view the dedusting operation.

18 Claims, 7 Drawing Sheets

(56) References Cited

U.S. PATENT DOCUMENTS

2019/0381537 A1* 12/2019 Lutz ................ B07B 11/04

FOREIGN PATENT DOCUMENTS

IT 201900004771 A1 * 9/2020
WO PCT/KR2013/002924 4/2013

* cited by examiner

VIBRATORY FEEDING DEVICE FOR COMPACT DEDUSTING APPARATUS

FIELD OF THE INVENTION

The invention disclosed in this application is directed generally to the cleaning and handling of particulate materials, such as plastic pellets, regrind, tablets, grains, minerals, and the like, and particularly to a vibratory feeding apparatus that improves the performance of a particulate cleaning apparatus that is compactly configured to clean the particulate materials from dust and debris carried therewith by inducing a cleaning air flow through the apparatus.

BACKGROUND OF THE INVENTION

It is well known, particularly in the field of transporting and using particulate materials, commonly coarse powders, granules, pellets, and the like that it is important to keep product particles as free as possible of contaminants. Particulates are usually transported within a facility where they are to be mixed, packaged, or used in a pressurized tubular system that in reality produces a stream of material that behaves somewhat like a fluid. As these materials move through the pipes, considerable friction is generated not only among the particles themselves, but also between the tube walls and the particles in the stream. In turn, this friction results in the development of particle dust, broken particles, fluff, and streamers (ribbon-like elements that can "grow" into quite long and tangled wads that will impede the flow of materials or even totally block the flow). The characteristics of such a transport system are quite well known, as is the importance and value of keeping product particles as free as possible of contaminants.

The term "contaminant" as used herein includes a broad range of foreign material, as well as the broken particles, dust, fluff, and streamers mentioned in the preceding paragraph. In any case, contaminants are detrimental to the production of a high quality product, and in some situations a health risk to employees of the producer and possibly even a source of danger in that some contaminants can produce a dust cloud which, if exposed to an ignition source, may explode.

Considering product quality, and focusing on moldable plastics as a primary example, foreign material different in composition from the primary material, such as dust, non-uniform material of the primary product, fluff, and streamers, does not necessarily have the same melting temperatures as the primary product and causes flaws when the material is melted and molded. These flaws result in finished products that are not uniform in color, may contain bubbles, and often appear to be blemished or stained, and, therefore, cannot be sold. Heat in the injection molding machine can vaporize dust that leads to tiny gas bubbles in the finished product. Heat also burns dust and causes "black spots," which are carbonized dust. Sometimes dust pockets in the machine do not melt and cause "soft spots" or "white spots" as these defects are commonly called. It is important to note that, since these same non-uniform materials often do not melt at the same temperature as the primary product, the un-melted contaminants cause friction and premature wear to the molding machines, resulting in downtime, lost production, reduced productivity, increased maintenance and, thus, increased overall production costs.

Conventional particulate material dedusting devices, such as is disclosed in U.S. Pat. No. 5,035,331, granted to Jerome I. Paulson on Jul. 30, 1991, utilize first and second wash decks, formed as sloped planar surfaces within the apparatus and having openings therein for the passage of pressurized air therethrough to pass through particulate material flowing along the wash decks. Between the two wash decks, the particulate material passes through a Venturi zone, which combined with the passage of air through the particulate material on the wash decks, discharges dust and other contaminants upwardly with the air flow to be discharged from the apparatus.

In U.S. Pat. No. 7,380,670, granted on Jun. 3, 2008, to Jerome I. Paulson, Heinz Schneider and Paul Wagner, a compact dedusting apparatus having back-to-back wash deck assemblies, provides increased capacity by doubling the wash decks and the Venturi zones, which requires the inflow of particulate material to be equally divided between the two wash deck assemblies. In both U.S. Pat. Nos. 5,035,331 and 7,380,670, a magnetic flux field is applied to the infeed of particulate material to neutralize the static charges attracting the contaminants to the particulate pellets to enhance the operation of the wash decks in separating contaminants from the particulate material.

Uniceltec, a Korean Corporation, developed and marketed a compact dedusting apparatus disclosed in PCT Patent Application No. PCT/KR2013/002924, filed on Apr. 8, 2013, by Joong Soon Kim, et al. This compact dedusting apparatus, with appropriate improvements to meet the demands of the U.S. market, has been marketed in the U.S. by Pelletron Corporation as the Model C-20 dedusting apparatus. Applicants have made significant additional improvements to the Model C-20 dedusting apparatus and desire to protect such improvements by way of this patent application. Among the problems found in the presently marketed C-20 dedusting apparatus is the provision of a metering device that wears through engagement with the particulate materials, adds a corresponding amount of dust into the flow of particulate material to be cleaned, and tends to clog, interrupting the flow of particulate material into the cleaning apparatus. Another problem with the metering device is the tendency for the metering device to clog with inflowing particulate material, which disrupts the operation of the cleaning apparatus.

In U.S. Pat. No. 9,962,741, granted on May 8, 2018, to Heinz Schneider and Joseph T. Lutz, the compact dedusting apparatus with remote discharge to which the instant application is an improvement is shown and described. In this Schneider patent, the particulate material infeed hopper is provided with a rotatable, fluted metering device, which requires a powered motor, preferably in the form of an electric motor, to provide rotative power to the fluted metering device. It would be desirable to provide a particulate material feeding device which is simpler in configuration and more effective in operation.

Accordingly, it would be desirable to provide a compact dedusting apparatus that would solve problems of the previously developed dedusting apparatus, particularly with respect to the particulate material feeding apparatus.

SUMMARY OF THE INVENTION

It is an object of this invention to overcome the disadvantage of the prior art by providing an improved particulate material feeding apparatus for a compact dedusting apparatus.

It is another object of this invention to provide a vibratory feeding apparatus to improve the performance of a particulate dedusting apparatus.

It is a feature of this invention that the particulate materials are cleaned of dust and debris carried therewith into the dedusting apparatus by inducing a cleaning air flow through the apparatus.

It is another feature of this invention that the device for feeding particulate material through the dedusting apparatus is improved by utilizing vibrated feeding device to feed particulate material into the dedusting area of the apparatus.

It is an advantage of this invention that the vibratory movement is provided by a pneumatically powered vibration generator.

It is another feature of this invention that the vibration generator is affixed to a feed pan which receives particulate material passing through the product infeed opening.

It is another advantage of this invention that the vibration of the feed pan induces movement of the particulate material toward an outlet opening through which the particulate material passes into a receiving bowl for feeding into the cleaning area of the dedusting apparatus.

It is still another feature of this invention that the feed pan is isolated from the attachment flange that is connected to the supply of contaminated particulate material to pass through the infeed opening into the feeding device by elastomeric isolators.

It is still another advantage of this invention that the elastomeric isolators prevent the transmission of vibration to the outer housing and other components of the dedusting apparatus.

It is yet another feature of this invention to provide a series of ionizing pins to induce negative ions onto the individual pellets as the particulate material passes through a vertical portion of the dedusting apparatus.

It is yet another advantage of this invention that the particulate material follows a sloped floor to direct ionized particulate material into the vertical Venturi chamber through which a flow of cleaning air is fed upwardly to lift the dust particles and the debris, which are both significantly lighter that the individual pellets of the particulate material, from the particulate material being cleaned.

It is still another feature of this invention that the air flow through the Venturi chamber is counter to the movement of the particulate material and is generated by a compressed air operated vacuum generator in the form of a line vac.

It is still another object of this invention to provide an interchangeable carryover deflector frame having an extension member that projects into the housing of the dedusting apparatus and aligns with the internal structure of the housing.

It is a further advantage of this invention that the cross-sectional area of sloped portion is modified by the carryover deflector to allow for varying grades of particulate material to be cleaned in the dedusting apparatus.

It is still a further advantage of this invention that the interchangeable carryover deflector frame reduces carryover by projecting into the vertical section between the Venturi chamber to deflect particulate material entrained in the air flow through the Venturi chamber so as to direct the particulate material toward the product discharge opening.

It is a further feature of this invention that the extension member can be formed with different thicknesses so as to increase or decrease the cross-sectional area of sloped portion 24.

It is yet another object of this invention to provide a compact dedusting apparatus with a vibrating infeed mechanism and an interchangeable carryover deflector to improve the cleaning operations of the compact dedusting apparatus.

These and other objects, features and advantages are accomplished according to the instant invention by providing a compact dedusting apparatus for cleaning particulate materials of dust and debris contaminates in particulate materials and having a housing defining a cleaning area for removing contaminants from particulate material to create cleaned particulate material and a product discharge opening through which cleaned particulate material can be discharged from said housing. The dedusting apparatus includes an infeed apparatus having a vibratory feed pan powered by a vibration generator to induce vibrations therein. The dedusting apparatus also includes a Venturi chamber to remove contaminants from the particulate material by a flow of air passing upwardly through the product discharge opening. The dedusting apparatus further includes an interchangeable carryover deflector having a chamber extension member that aligns with internal structure to control the flow of particulate material into said Venturi chamber and deflects particulate material entrained in the air flow through the Venturi chamber toward the product discharge opening. The carryover deflector incorporates an observation window to view the dedusting operation.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Referring to FIGS. 1-7, a compact dedusting apparatus incorporating the principles of the instant invention can best be seen. The compact dedusting apparatus utilizes the general dedusting techniques disclosed in U.S. Pat. No. 5,035,331, issued to Jerome I. Paulson on Jun. 3, 1991, including the passage of air through a Venturi zone where particulate material passes and the flow of air removes the dust and debris from the particulate material. The particulate material is also subjected to ionization that directs negative ions onto the particulate material to separate the pellets from the minute dust particles. These generally known contaminant removing techniques are structured in a different configuration that is generally depicted in U.S. Pat. No. 9,962,741, granted on May 8, 2018 to Heinz Schneider and Joseph T.

Lutz. However, the product feeding mechanism has been improved from the metering device as shown and described in U.S. Pat. No. 9,962,741.

The dedusting apparatus 10 is generally rectangular in shape and configuration. The outer housing 12 is preferably formed of a durable material such as steel or cast iron, and can be formed by casting techniques. The top of the housing 12 is formed with an attachment flange 13 that can be connected to a supply of particulate material (not shown) to pass through the infeed opening 14 in the attachment flange 13 for introduction into the vibratory feeding device 15. Vibratory movement is provided by a pneumatically powered vibration generator 16 that is affixed to a feed pan 17 which receives particulate material passing through the infeed opening 14. The vibration in the feed pan 17 induces movement of the particulate material toward an outlet opening 18 through which the particulate material passes into a receiving bowl 19 for feeding into the cleaning area 20. The feed pan 17 is isolated from the attachment flange 13 by elastomeric isolators 17a, which prevent the transmission of vibration to the outer housing 12 and other components of the dedusting apparatus 10.

The higher the pressure of the compressed air, the greater the throughput rate of particulate material will be. The particulate material flows out of the receiving bowl 19 and into a first chamber 21 of the cleaning area 20. A series of ionizing pins 25 induce negative ions onto the individual pellets as the particulate material passes downwardly through a vertical portion 22 of the first chamber 21. The particulate material then encounters a downwardly sloped floor 23 that creates a sloped portion 24 of the first chamber 21 to direct the ionized particulate material into the vertical Venturi chamber 26 which oriented parallel to, but offset from the vertical portion 22 by the sloped portion 24. A flow of cleaning air is fed upwardly, as will be described in greater detail below, through the Venturi chamber 26 so that the air will lift the dust particles and the debris, which are both significantly lighter that the individual pellets of the particulate material, thereby removing the dust and debris and cleaning the particulate material. The dust and debris laden air is then discharged from the cleaning area 20, as will also be described in greater detail below. The cleaned particulate material then passes downwardly by gravity through the product discharge opening 28 at the bottom of the housing 12.

The air flow through the Venturi chamber 26 is counter to the movement of the particulate material and is preferably generated by a compressed air operated vacuum generator 30 in the form of a line vac mounted on the conduit 33 supported from the housing 12 to create an air flow through the discharge opening 28 and to a conduit 33 passing from the cleaning area 20 to the dust collector 35 offset from the dedusting apparatus 10. The interchangeable carryover deflector frame 41 has an extension member 49 that projects into housing 12 and aligns with the internal structure to modify the cross-sectional area of sloped portion 24 and to allow for varying grades of particulate material to be cleaned in the dedusting apparatus 10. Further, the interchangeable carryover deflector frame 41 reduces carryover by projecting into the vertical section between the Venturi chamber 26 and discharge transition chamber 26a, thus deflecting any particulate material entrained in the air flow and directing it toward the discharge opening 28.

The extension member 49 can be formed in varying thicknesses. Since the extension member 49 is integral with the interchangeable carryover deflector frame 41, a changing of the desired thickness of the extension member 49 requires the interchangeable carryover deflector frame 41 to be replaced by one with a differently sized extension member 49. The different thickness of the extension member 49 increases or decreases the cross-sectional area of sloped portion 24. This allows the dedusting apparatus 10 to effectively clean particulate materials which have a smaller particle size and regular particle shape such as pelletized materials, as well as particulate material with larger particle size and irregular particle shape such as ground materials [for the recycling industry]. The larger-sized and irregular-shaped particulate material would otherwise create a blockage inside the cleaning area 20 of the dedusting apparatus 10, as particulate material could not pass through to be cleaned. Without the ability to change the cross-sectional area of the sloped portion 24, the dedusting apparatus 10 would be limited to a more narrow range of applications.

One skilled in the art will recognize that the location of the vacuum generator 30 could also be placed elsewhere in the housing 12 depending on the configuration of the housing 12. The conduit 33 is in open communication with the Venturi chamber 26 at a discharge transition chamber 26a forming an upper portion of the Venturi chamber 26 to draw the dust and debris laden air from the Venturi chamber 26 into the conduit 33. This vacuum draws air into the Venturi chamber 26 from the product discharge opening 28 at the bottom of the housing 12.

Figure 1:
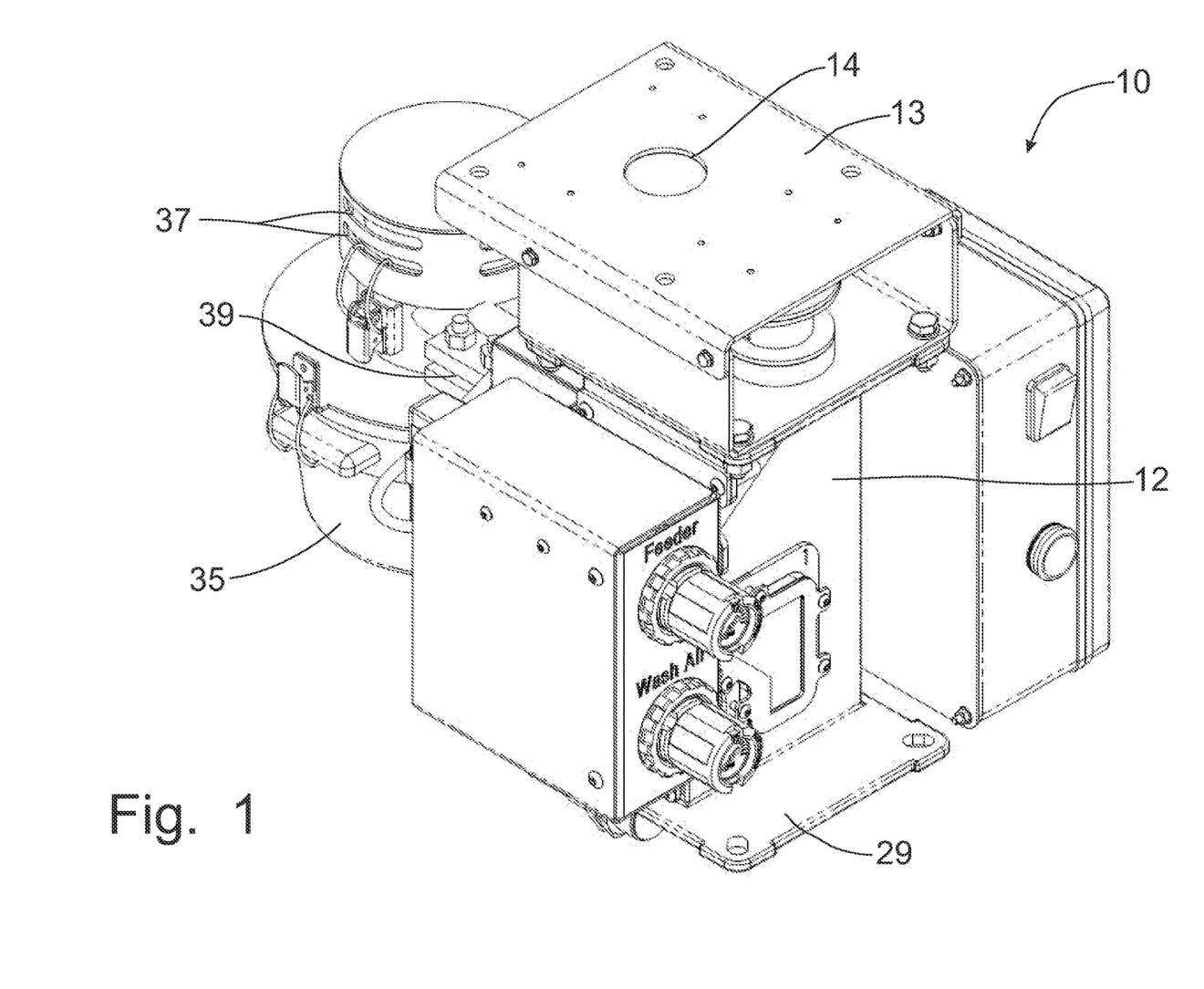
FIG. 1 is a perspective view of a compact dedusting apparatus incorporating the principles of the instant invention.
Figure 2:
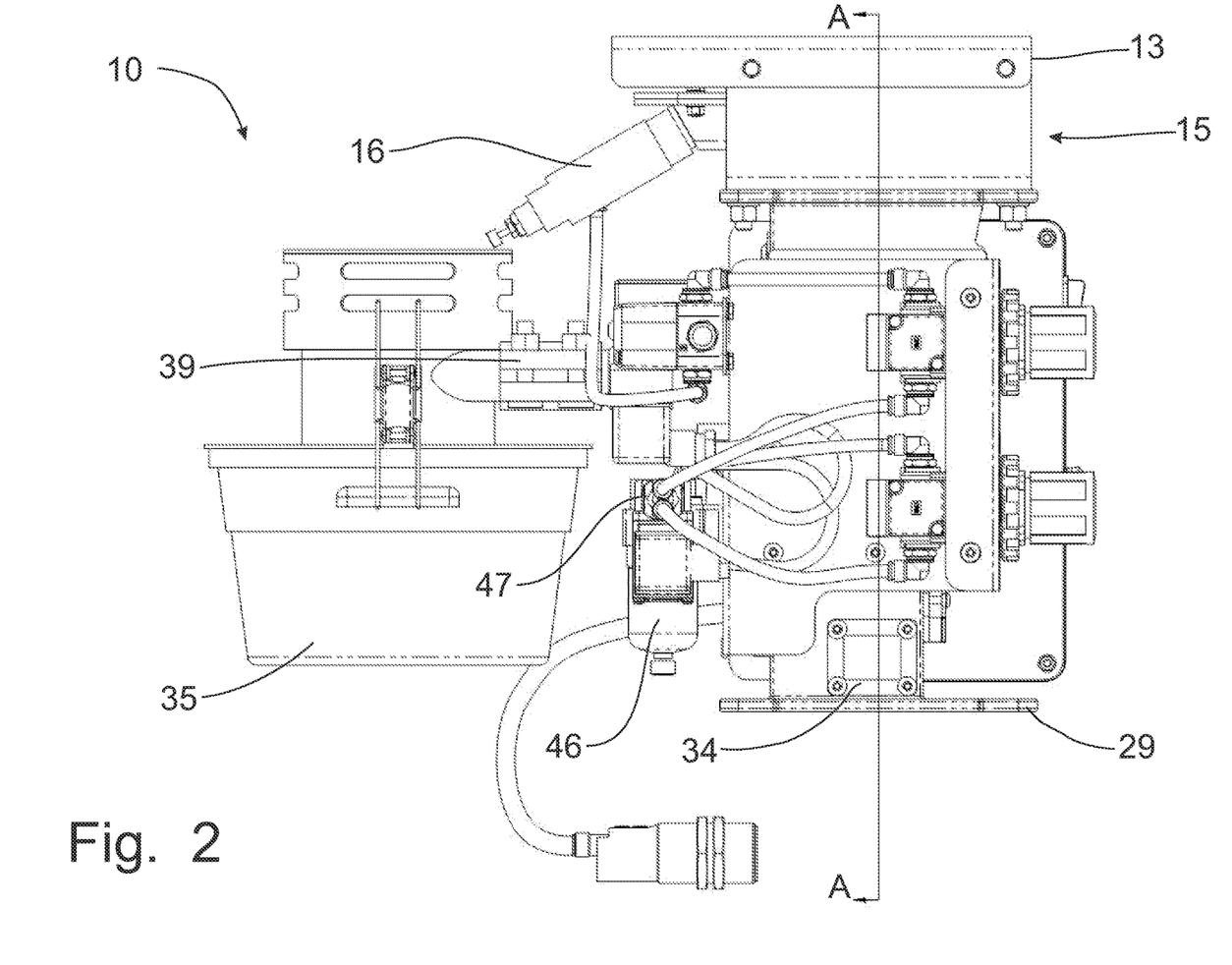
FIG. 2 is side elevational view of the compact dedusting apparatus shown in FIG. 1.
Figure 3:
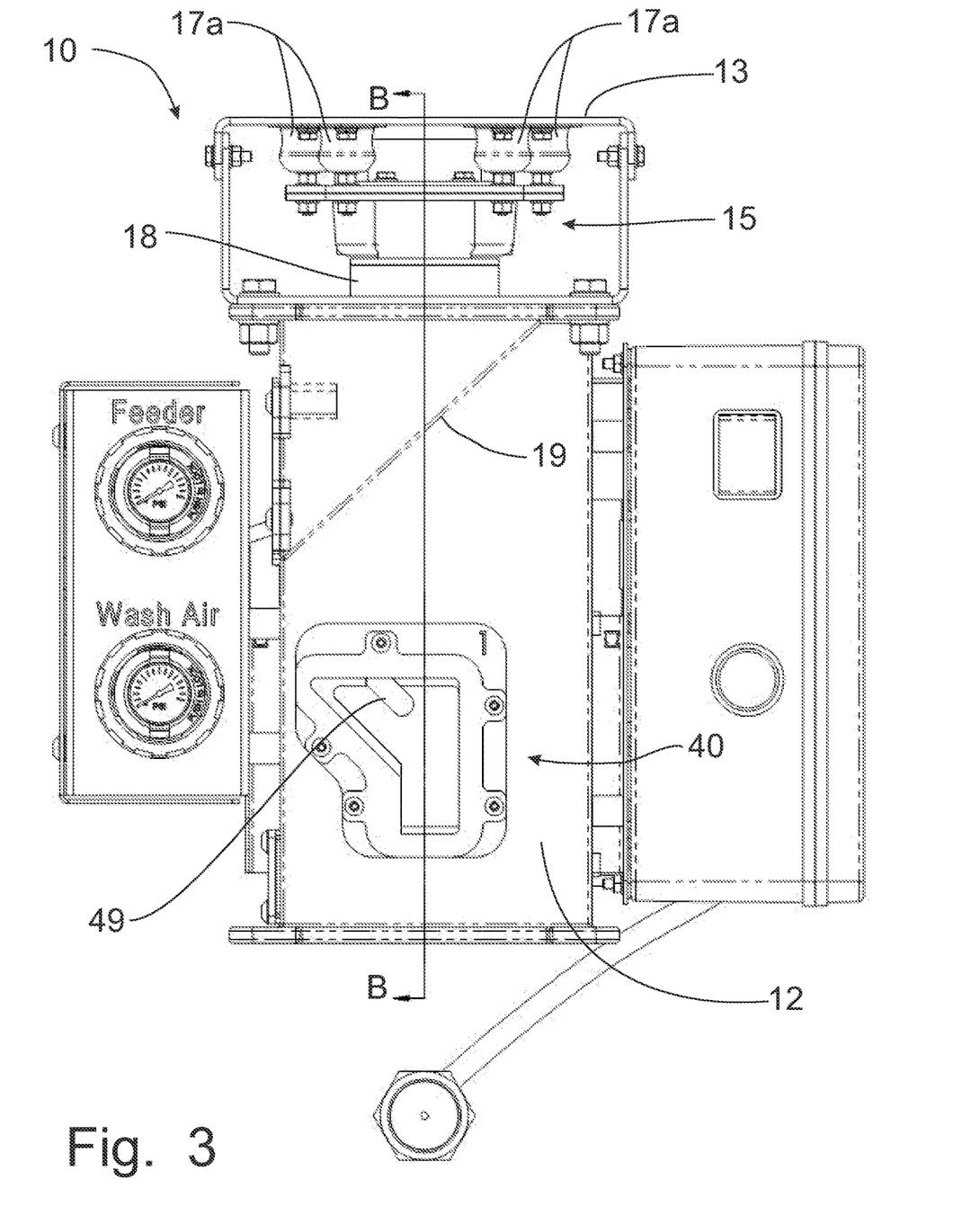
FIG. 3 is a front elevational view of the compact dedusting apparatus.
Figure 4:
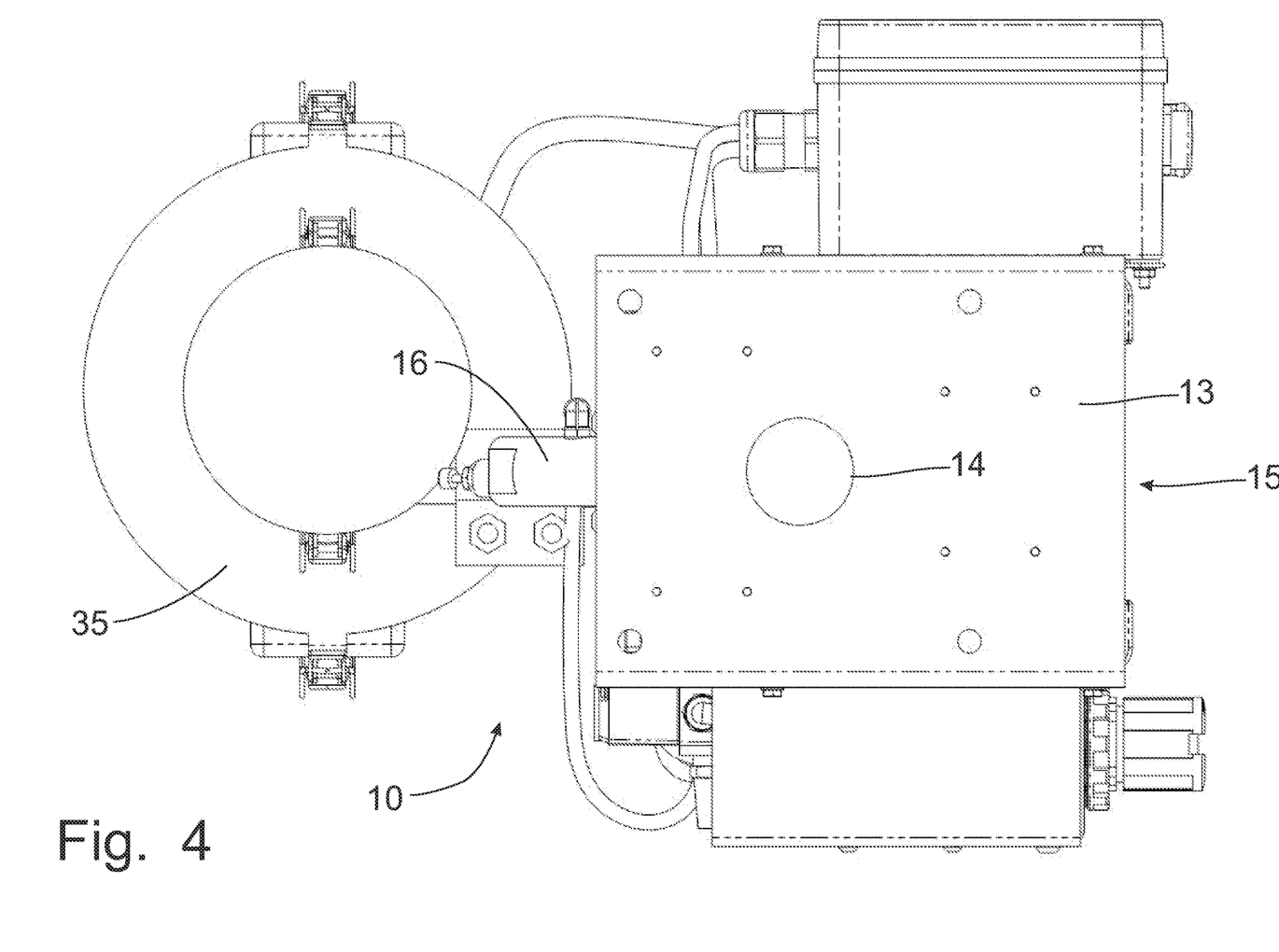
FIG. 4 is a top plan view of the compact dedusting apparatus.
Figure 6:
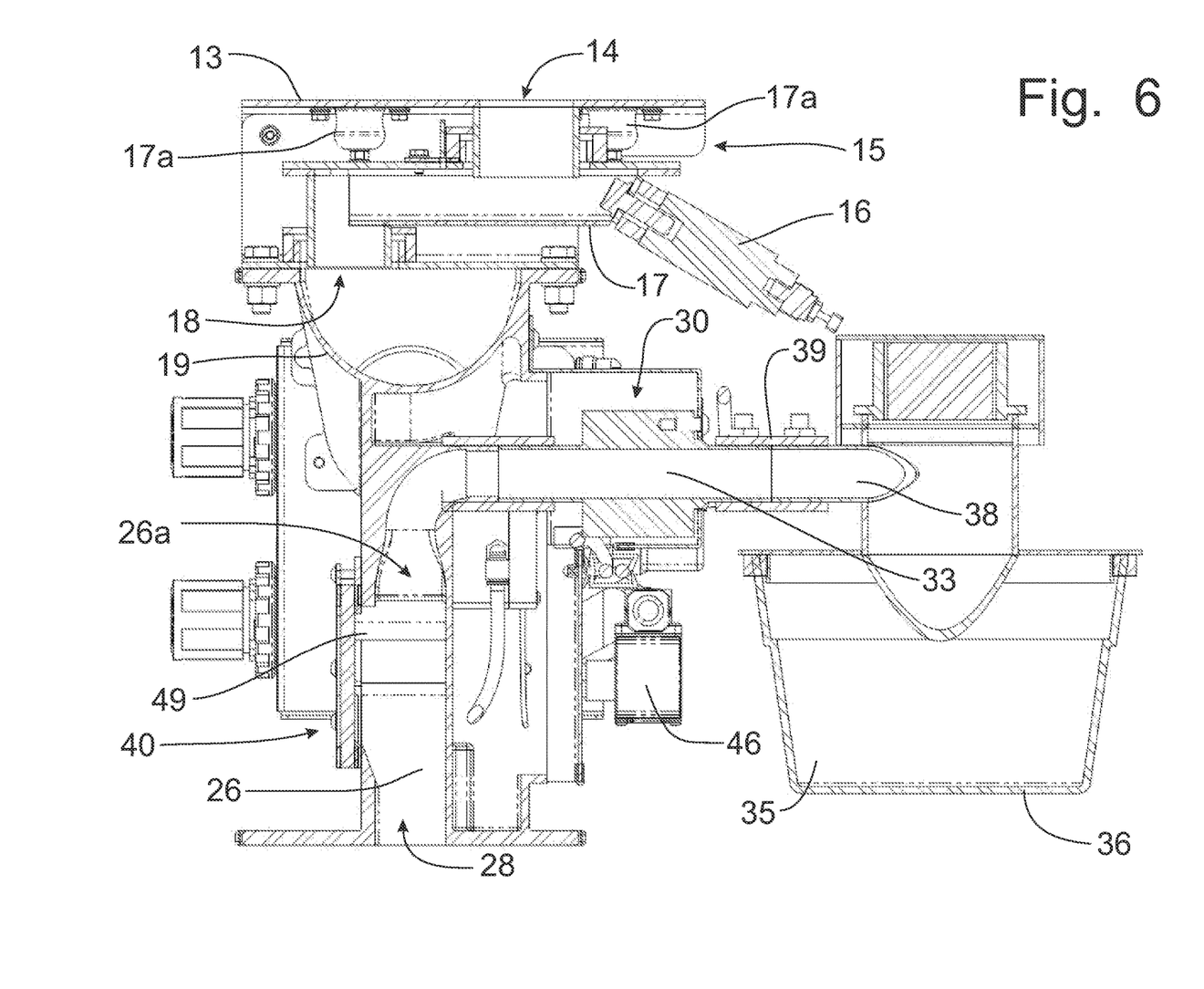
FIG. 6 is a cross-sectional view of the compact dedusting apparatus corresponding to lines B-B of FIG. 3.
Figure 7:
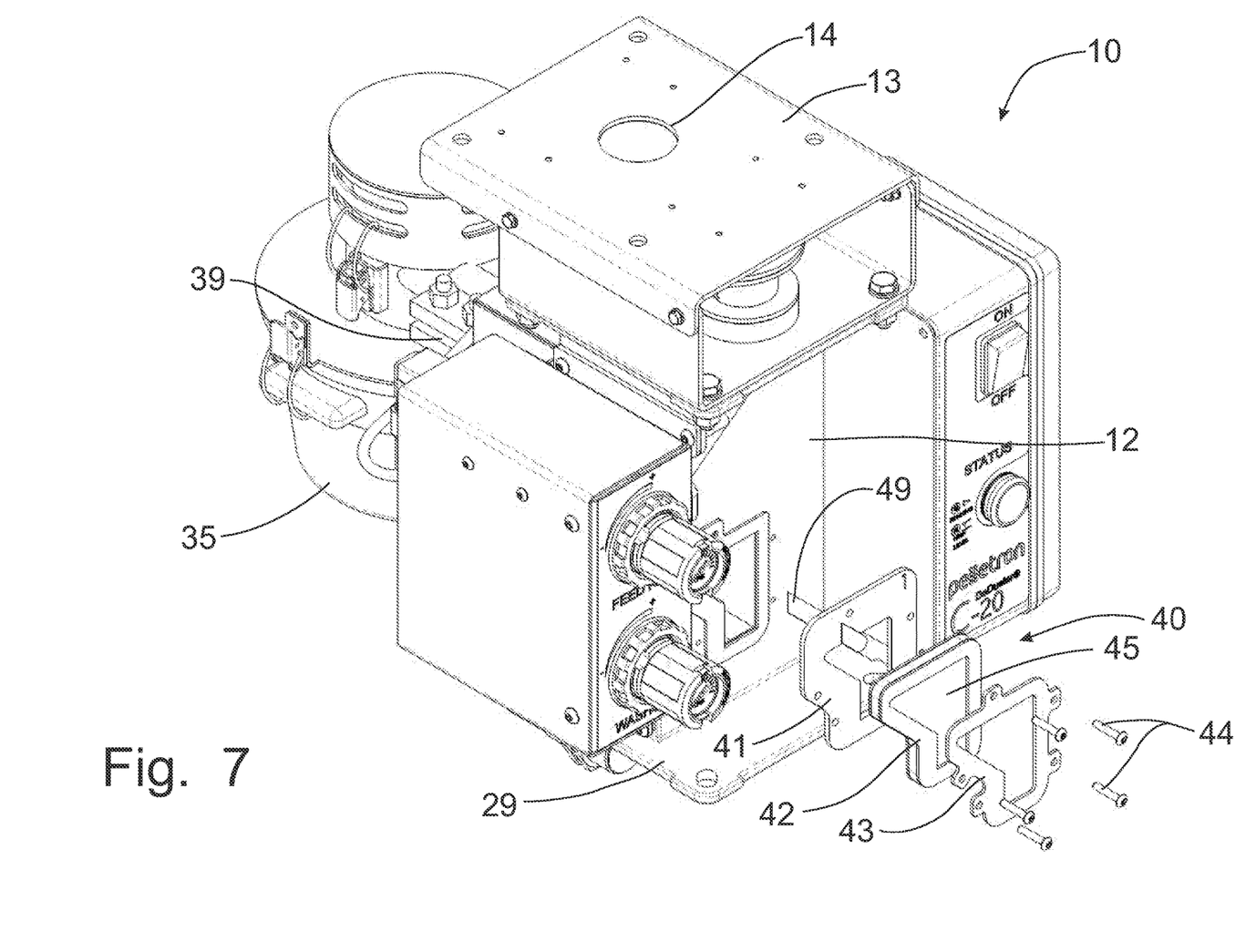
FIG. 7 is a perspective view corresponding to FIG. 1, but showing an exploded view of the transparent window assembly in the front wall of the dedusting apparatus to permit observation of the cleaning mechanism.

The vacuum generator 30 receives compressed air for the operation thereof from a supply of compressed air connected to the compressed air connector 46a on the back side of the housing 12, as best seen in FIG. 6. The compressed air flows through an inlet air filter 46 and is fed into a Wye connector port 47 to divide the flow of compressed air into two paths, as best seen in FIG. 2. A first flow path delivers compressed air to the compressed air operated vacuum generator 30 which converts the relatively high pressure, low volume air flow into a relatively low pressure, high volume air flow through the vacuum generator 30 to draw air through the discharge conduit 33 and induce a cleansing air flow through the Venturi chamber 26. This first flow path is split again before the vacuum generator 30 to deliver a flow of compressed air to the ionizer pins 25 to where the compressed air flows around the ionizer pins 25 to force ions into the flow of particulate material passing through the vertical portion 22 of the first chamber 21. The second flow path formed by the Wye connector port 47 delivers compressed air to the pneumatically powered vibration generator 16 to operate the vibratory feeding device 15.

Under certain circumstances relating to the use of the compact dedusting apparatus 10, the mounting flange 29 at the bottom of the housing 12 can be connected to a receiving device (not shown) that receives the cleaned product. The receiving device can seal against the mounting flange 29 which would prevent the vacuum generator 30 from drawing air through the product discharge opening 28. In such circumstances, a filtered auxiliary port 34 is opened to allow air to be drawn through a clean air inlet port 27 positioned adjacent the product discharge opening 28 so that the air will enter the Venturi chamber 26 through the product discharge opening 28.

Figure 5:
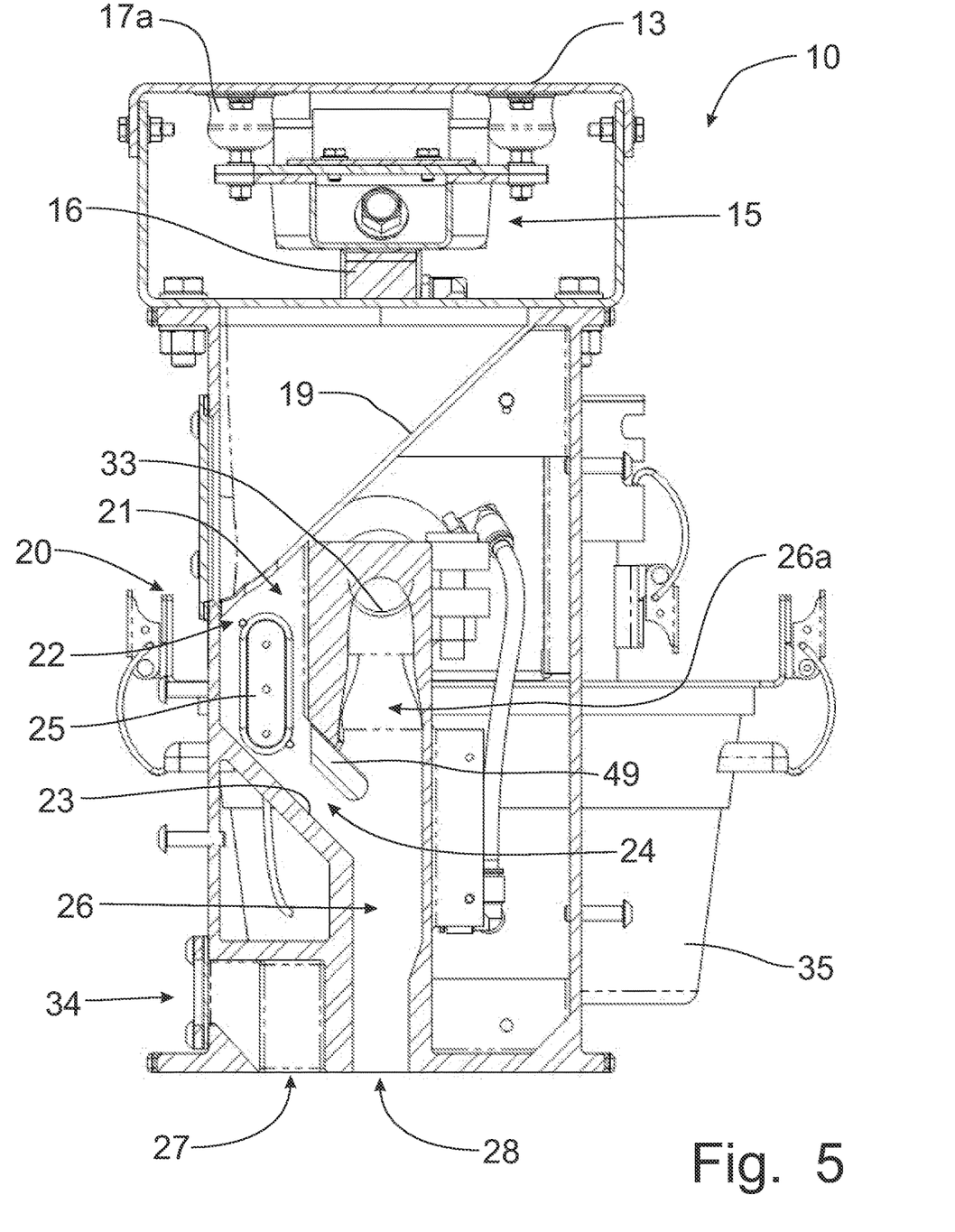
FIG. 5 is a cross-sectional view of the compact dedusting apparatus corresponding to lines A-A in FIG. 2, all of the electrical components being removed for purposes of clarity of the structure of the dedusting apparatus.

The upward movement of cleaning air through the Venturi chamber 26 is moving at a selected velocity, which can vary depending on the particulate material being cleaned, to carry the dust and debris upwardly while allowing the particulate material to fall downwardly. Sometimes, however, particulate material gets entrained in the upward air flow, which is commonly referred to as carryover. Once the entrained air flow reaches the conduit 33, which has a smaller cross-sectional area than the Venturi chamber 26, the velocity of the air flow increases, which further entrains carryover particulate material. To allow carryover particulate material to drop back downwardly toward the product discharge opening 28, the discharge transition chamber 26a of the Venturi chamber 26 is widened, as is best seen in FIG. 5, to have a larger cross-sectional area than the Venturi chamber 26 below the sloped floor 23, which causes the velocity of the air flow to decrease and provides an opportunity for the carryover particulate material to fall out of entrainment and drop toward the product discharge opening 28 before being drawn into the conduit 33.

As is best seen in FIG. 6, the conduit 33 extends through the vacuum generator 30 toward the dust collector 35. Although the dust collector 35 can be formed in different configurations, including filters, scrubbers, and cyclones, among others, a compact dust collector 35 that spins the dust and debris laden air to separate the dust particles and debris therefrom is effective. The separated dust and debris is collected in a removable container 36 at the bottom of the dust collector 35, while the cleaned air is discharged through vents 37 at the top of the dust collector 35. In certain circumstances, the dust collector 35 can be located at a remote location where the discharge of the cleaned air is acceptable, and the conduit 33 extended to the remote location.

The placement of the vacuum generator 30 within the housing 12 enables the dust collector 35 to be remotely located without adversely changing the air flow through the dedusting apparatus 10. For this reason, the conduit 33 terminates at an appropriate distance outside of the housing 12 so that the inlet conduit 38 of the dust collector 35 can be connected to the conduit 33 and secured by clamps 39. In circumstances where the dust collector 35 is to be remotely located, the clamps 39 are disconnected to allow the dust collector 35 to be appropriately positioned while a length of conduit extension (not shown) is interconnected between the conduit 33 and the inlet conduit 38 to carry the dust and debris laden air to the remotely located dust collector 35.

The housing 12 has a transparent glass window assembly 40 in the front of the housing 12 corresponding to the location of the Venturi chamber 26. The transparent window assembly 40 is shaped to correspond to the shape of the sloped portion 24 of the first chamber and the lower vertical portion of the Venturi chamber 26 to permit the operator to observe the operation of the dedusting apparatus 10 so that appropriate adjustments can be made to the flow rate of the particulate material fed into the first chamber 21 or the rate of velocity of the air flow through the Venturi chamber 26 to provide an effective cleansing of the particulate material. As seen in exploded view of FIG. 7, the transparent glass window 45 is trapped between a pair of gaskets 42 and sealed between an interchangeable carryover deflector frame 41 and a securement flange 43. Insertion of fasteners 44 compresses the frames 41, 43 and the gaskets 42 together to seal against the housing 12.

Modification of the flow of particulate material and the flow of air through the Venturi chamber 26 and into the conduit 33 can be affected by a chamber extension member 49 that is formed to be an integral part of the interchangeable carryover deflector frame 41. The thickness of the chamber extension member 49 can be changed by disassembling the window assembly 40 and swapping out the interchangeable carryover deflector frame 41 for a different configuration of a chamber extension member 49. One skilled in the art will understand that a sensor 50, shown in FIGS. 2 and 3, mounted below the discharge opening 28 can be used to detect particulate material collecting in the dedusting area 20.

In operation, the compact dedusting apparatus 10 is positioned to receive a supply of particulate material into the infeed opening 14 at the top of the housing 12. The particulate material is received through the infeed opening 14 by a vibratory feed pan 17 that directs the particulate material to an outlet opening 18 and, ultimately, to a cleaning area 20. The particulate material is subjected to ionization by the ionization pins 25 located in the vertical portion 22 of the first chamber 21. The ionized particulate material then lands on the sloped floor 23 to guide the particulate material into the Venturi chamber 26 where a flow of air coming upwardly through the product discharge opening 28 removes the dust particles and debris from the particulates so that the cleaned material can continue to fall by gravity downwardly and pass through the product discharge opening 28. The presence of the interchangeable carryover deflector frame 41, with an integral extension member 49, keeps the flow of ionized particulate material directed to the Venturi chamber 26 to clean dust particles and debris therefrom.

The dust and debris laden air continues to flow upwardly to a discharge conduit 33 located at the top of a discharge transition chamber 26a of the Venturi chamber 26. Between the lower vertical portion of the Venturi chamber 26 and the discharge conduit 33, the discharge transition chamber 26a of the Venturi chamber 26 expands in size and cross-sectional area so that the velocity of the air flow is reduced to allow any carryover pellets to drop out of entrainment in the air flow before moving into the discharge conduit 33. The dust and debris laden air continues through the vacuum generator 30 to the dust collector 35, which can be located at a remote location and connected to the conduit 33 by a supplemental conduit (not shown). Since the vacuum generator 30 is located within the housing 12, the dust collector 35 can be positioned remotely from the dedusting apparatus 10 without deteriorating the flow of air through the Venturi chamber 26.

The housing 12 has an opening therein covered by a transparent window 45, which could be glass, polycarbonate, acrylic or other clear material, mounted between a pair of gaskets 42 and secured to the housing 12 by fasteners 44 sealing the gaskets 42 between the interchangeable carryover deflector frame 41 and a securement flange 43, as described in greater detail above, so that the operator can observe the operation of the dedusting area 20 and make operational adjustments as needed. When the lower mounting flange 29 is sealed against a receiving device (not shown) the flow of cleaning air can pass through a clean air inlet port 27 that extends from the side of the housing 12 to an opening in said lower mounting flange adjacent the product discharge opening 28 so that air can be drawn through the clean air inlet port 27 and then upwardly through the product discharge opening 28 to and through the Venturi chamber 26 and remove dust and debris from the particulate material.

It will be understood that changes in the details, materials, steps and arrangements of parts, which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based upon the description may be employed in other embodiments without departing from the scope of the invention. For example, the vibration generator could be powered electrically instead of pneumatically. Accordingly, the following claims are intended to protect the invention broadly, as well as in the specific form shown.

Having thus described the invention, what is claimed is:

1. A dedusting apparatus for cleaning contaminants from particulate material, comprising:
   a housing defining a cleaning area for removing contaminants from particulate material to create cleaned particulate material and a product discharge opening through which cleaned particulate material can be discharged from said housing;
   an infeed apparatus located at an upper portion of said housing to receive a supply of particulate material, said infeed apparatus including attachment flange having an infeed opening therein for the passage of particulate material to be cleaned of contaminants, said infeed apparatus further including a vibratory feed pan urging said particulate material to an outlet opening in said vibratory feed pan and into said cleaning area;
   a vibration generator operably connected to said vibratory feed pan to induce vibrations therein;
   a Venturi chamber positioned to receive particulate material passing through said infeed opening and to remove contaminants from the particulate material by a flow of air passing upwardly through the product discharge opening and into the Venturi chamber, while cleaned particulate material falls through the product discharge opening; and
   a discharge conduit positioned above the Venturi chamber to receive dust and debris laden air moving upwardly from said Venturi chamber, said discharge conduit moving said dust and debris laden air remotely from said cleaning area;
   an observation window assembly located in said housing in alignment with said Venturi chamber, said observation window assembly being formed of an interchangeable carryover deflector frame being integrally formed with a chamber extension member that aligns with internal structure to control the flow of particulate material into said Venturi chamber; and
   a mounting frame encompassing a transparent window, and a securement flange with fasteners passing through the securement flange to engage the housing and seal the window assembly against the housing.

2. The dedusting apparatus of claim 1 wherein said cleaning area includes an ionizing device upstream of said Venturi chamber to ionize the contaminants in said particulate material.

3. The dedusting apparatus of claim 1 wherein vibratory feed pan is isolated from said attachment flange by elastomeric isolators.

4. The dedusting apparatus of claim 1 wherein said vibration generator is powered pneumatically.

5. The dedusting apparatus of claim 1 wherein said interchangeable carryover deflector frame can be interchanged with a substitute interchangeable carryover deflector frame having a differently shaped chamber extension member to control the flow of particulate material to be cleaned in the Venturi chamber.

6. A dedusting apparatus for cleaning contaminants from particulate material, comprising:
   a housing defining a cleaning area for removing contaminants from particulate material to create cleaned particulate material, said housing including internal structure directing a flow of particulate material to be cleaned of contaminates and a product discharge opening through which cleaned particulate material can be discharged from said housing;
   an infeed apparatus located at an upper portion of said housing to receive a supply of particulate material, said infeed apparatus including attachment flange having an infeed opening therein for the passage of particulate material to be cleaned of contaminants,
   a Venturi chamber positioned to receive particulate material passing through said infeed opening and to remove contaminants from the particulate material by a flow of air passing upwardly through the product discharge opening and into the Venturi chamber, while cleaned particulate material falls through the product discharge opening; and
   a carryover deflector frame integrally formed with a chamber extension member that aligns with said internal structure to control the flow of particulate material from said infeed opening into said Venturi chamber.

7. The dedusting apparatus of claim 6 wherein said cleaning area includes an ionizing device upstream of said Venturi chamber with respect to the flow of particulate material to ionize the contaminants in said particulate material.

8. The dedusting apparatus of claim 7 wherein said infeed apparatus further includes a vibratory feed pan receiving said particulate material from said infeed opening and urging said particulate material to an outlet opening in said vibratory feed pan for distribution to said cleaning area.

9. The dedusting apparatus of claim 8 wherein vibratory feed pan is isolated from said attachment flange by elastomeric isolators.

10. The dedusting apparatus of claim 8 wherein vibration generator is powered pneumatically.

11. The dedusting apparatus of claim 6 wherein said carryover deflector frame incorporates an observation window in alignment with said Venturi chamber, said observation window being supported in said carryover deflector frame assembly and is formed as a transparent window.

12. The dedusting apparatus of claim 11 wherein said carryover deflector frame includes a securement flange with fasteners passing through the securement flange to engage the housing and seal the window assembly against the housing.

13. The dedusting apparatus of claim 12 wherein said interchangeable carryover deflector frame can be interchanged with a substitute carryover deflector frame having a differently shaped chamber extension member to control the flow of particulate material to be cleaned in the Venturi chamber.

14. The dedusting apparatus of claim 13 further comprising:
   a discharge conduit positioned above the Venturi chamber to receive dust and debris laden air moving upwardly from said Venturi chamber, said discharge conduit moving said dust and debris laden air remotely from said cleaning area.

15. A dedusting apparatus for cleaning contaminants from particulate material, comprising:
   a housing defining a cleaning area for removing contaminants from particulate material to create cleaned particulate material said housing including internal structure directing a flow of particulate material to be cleaned of contaminates and a product discharge opening through which cleaned particulate material can be discharged from said housing;
   an infeed apparatus located at an upper portion of said housing to receive a supply of particulate material, said infeed apparatus including attachment flange having an infeed opening therein for the passage of particulate material to be cleaned of contaminants, said infeed apparatus further including a vibratory feed pan urging said particulate material to an outlet opening in said vibratory feed pan and into said cleaning area;

a vibration generator operably connected to said vibratory feed pan to induce vibrations therein;

a Venturi chamber positioned to receive particulate material passing through said infeed opening and to remove contaminants from the particulate material by a flow of air passing upwardly through the product discharge opening and into the Venturi chamber, while cleaned particulate material falls through the product discharge opening; and a carryover deflector frame integrally formed with a chamber extension member that aligns with said internal structure to control the flow of particulate material from said infeed opening into said Venturi chamber.

16. The dedusting apparatus of claim 15 wherein vibratory feed pan is isolated from said attachment flange by elastomeric isolators, said vibration generator being powered pneumatically.

17. The dedusting apparatus of claim 16 wherein said cleaning area includes an ionizing device upstream of said Venturi chamber with respect to the flow of particulate material to ionize the contaminants in said particulate material.

18. The dedusting apparatus of claim 17 wherein said carryover deflector frame can be interchanged with a substitute carryover deflector frame having a differently shaped chamber extension member to control the flow of particulate material to be cleaned in the Venturi chamber.

* * * * *